United States Patent [19]

Stehle et al.

[11] Patent Number: 5,025,684

[45] Date of Patent: Jun. 25, 1991

[54] METHOD AND APPARATUS FOR CONTROLLING AN AUTOMATIC SHIFT TRANSMISSION

[75] Inventors: Heinz Stehle, Weissach; Thomas Wehr, Ditzingen; Joseph Petersmann, Wimsheim; Willi Seidel, Eberdingen-Hochdorf; Ludwig Hamm, Sindelfingen; Thomas Foeldi, Stuttgart; Gerhard Eschrich; Ronald Schwamm, both of Gerlingen; Wolfgang Runge, Ravensburg; Wolf-Dieter Gruhle, Tettnang; Peter Wendel, Kressbronn, all of Fed. Rep. of Germany

[73] Assignee: Dr. Ing. h.c.F. Porsche AG, Stuttgart, Fed. Rep. of Germany

[21] Appl. No.: 548,254

[22] Filed: Jul. 5, 1990

[30] Foreign Application Priority Data

Jul. 7, 1989 [DE] Fed. Rep. of Germany ....... 3922040

[51] Int. Cl.$^5$ .............................................. B60K 41/18
[52] U.S. Cl. ......................................... 74/862; 74/866
[58] Field of Search ................................... 74/862, 866

[56] References Cited

U.S. PATENT DOCUMENTS

| | | | |
|---|---|---|---|
| 3,027,776 | 4/1962 | Snyder | 74/862 |
| 3,942,393 | 3/1976 | Förster et al. | 74/866 |
| 4,258,591 | 3/1981 | Eckert et al. | 74/866 |
| 4,312,249 | 1/1982 | Horn et al. | 74/866 |
| 4,350,057 | 9/1982 | Kishi et al. | 74/866 |
| 4,501,170 | 2/1985 | Müller et al. | 74/866 |
| 4,599,917 | 7/1986 | Leorat et al. | 74/866 |
| 4,625,590 | 12/1986 | Müller | 74/866 |
| 4,637,278 | 1/1987 | Nbikawa et al. | 74/866 |
| 4,742,722 | 5/1988 | Schreiner | 74/866 |
| 4,788,892 | 12/1988 | Komoda et al. | 74/866 |
| 4,916,979 | 4/1990 | Irwin | 74/866 |

FOREIGN PATENT DOCUMENTS

| | | |
|---|---|---|
| 0273735 | 7/1988 | European Pat. Off. . |
| 3341652 | 6/1985 | Fed. Rep. of Germany . |
| 3615961 | 12/1986 | Fed. Rep. of Germany . |
| 8903319 | 4/1989 | PCT Int'l Appl. . |

Primary Examiner—Dirk Wright
Attorney, Agent, or Firm—Evenson, Wands, Edwards, Lenahan & McKeown

[57] ABSTRACT

In order to improve the shifting characteristics of an electrohydraulically controlled, automatically shifting transmission particularly during cornering and braking, the driving speed (v), the lateral acceleration (aq), and the time variation of the throttle valve position are sensed in addition to the throttle valve position (alpha) and the engine rotational speed (nmot). From the time variation of the throttle valve position, a signal can be derived for the prevention of an upshifting operation since a motor vehicle driver's foot moves away faster from the accelerator pedal when approaching a bend in the road than would be the case for the normal deceleration of the motor vehicle.

13 Claims, 3 Drawing Sheets

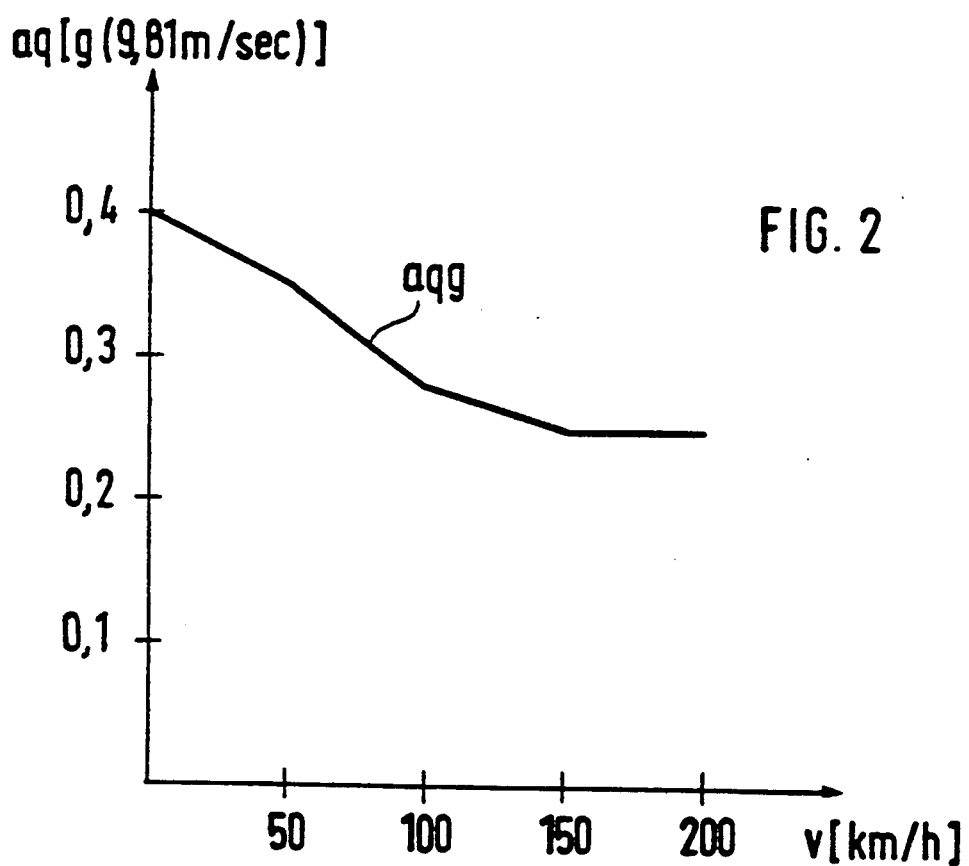

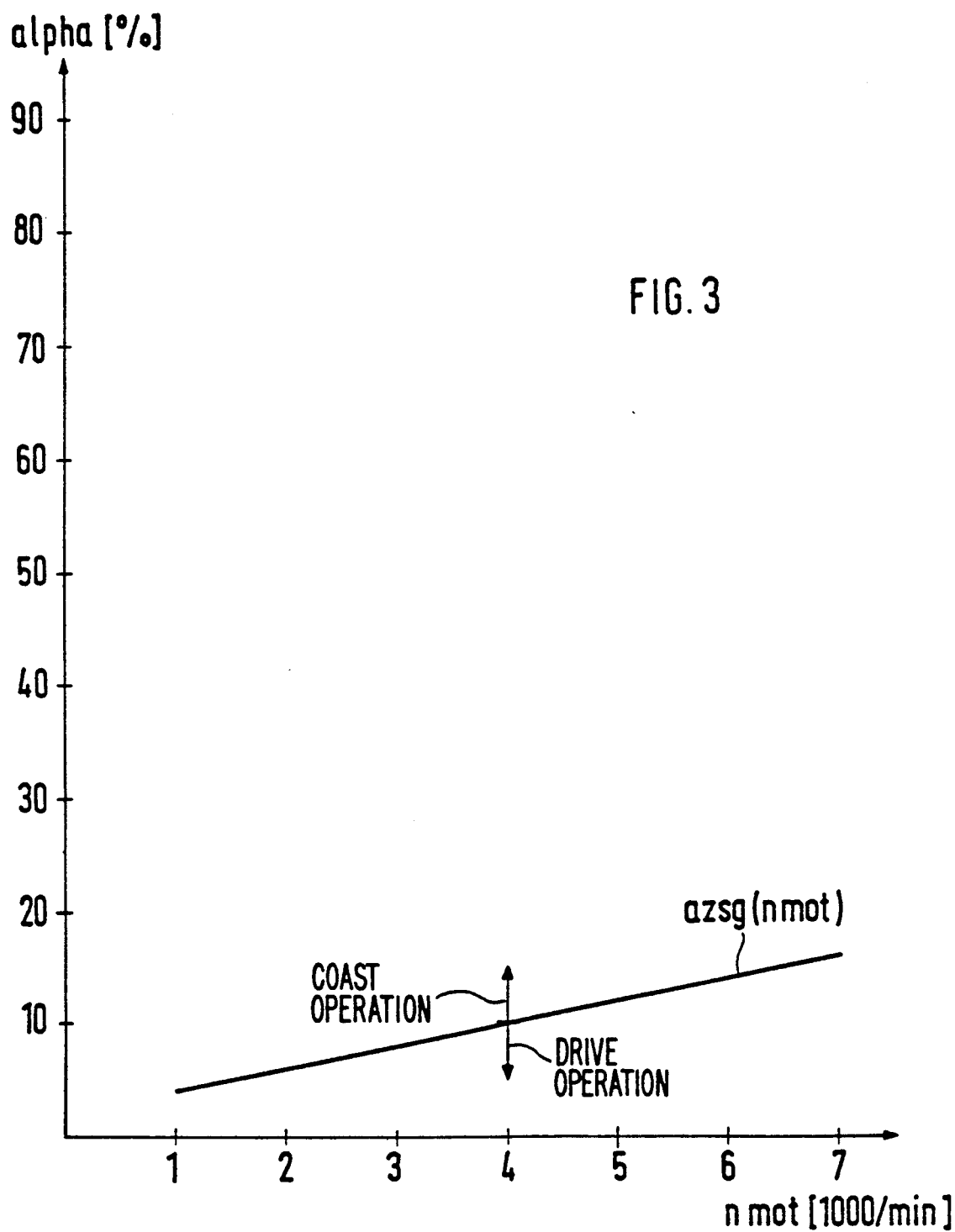

METHOD AND APPARATUS FOR CONTROLLING AN AUTOMATIC SHIFT TRANSMISSION

CROSS-REFERENCE TO RELATED APPLICATIONS

Applicants hereby cross-reference to a related Ser. No. 07/548,253, filed based upon German application Serial No. P 39 22 051.6, filed July 5, 1989, the subject matter of which is incorporated herein by reference.

BACKGROUND AND SUMMARY OF THE INVENTION

The present invention relates to a method and apparatus for an electrohydraulically controlled automatically shifting transmission and, more particularly, to a method and apparatus for a motor vehicle automatic shift transmission in which upshifting during a driving operation is delayed by a first time period if a speed of change of the throttle valve signal falls below a first limit value.

Conventional automatic transmission control systems of motor vehicles driven by internal-combustion engines initiate an upshift, as a rule, when the accelerator pedal is taken back. However, this is not always desirable during cornering or braking since load changes of this type, under certain circumstances, may result in unsafe driving conditions or, when the motor vehicle is accelerated again, one or several backshifts must be forced by giving more gas.

In this context, it is known from DE-PS 33 41 652 to avoid these upshifts at road bends by sensing the lateral acceleration of the motor vehicle. However, this only makes it possible to avoid a shifting at road bends.

It is, therefore, an object of the present invention to provide a method and apparatus for controlling an automatically shifting transmission which is capable of carrying out shifts (gear step changes) which are appropriate for respective situations.

This object has been achieved by utilizing a method and apparatus which delays upshifting during the drive operation by a first time period if a speed of change of the throttle valve signal falls below a first limit value.

Principal advantages of the present invention are that a method and apparatus for the control of an automatically shifting transmission are provided which, particularly in road bends, in front of road bends and during braking, carries out shifts which are appropriate for the respective situation.

The object and advantages are achieved by an expenditure, which is only slightly higher, of operating or driving parameters to be detected by sensors so that an already existing transmission control device for an electrohydraulic transmission, such as model 4HP22 of ZF Co., can be adapted to the present invention without any major expenditures. In addition to only one additional sensor, only a change of the control method is required.

BRIEF DESCRIPTION OF THE DRAWINGS

These and other objects, features and advantages of the present invention will become more apparent from the following detailed description of a presently preferred embodiment of the present invention when taken in conjunction with the accompanying drawings wherein.

FIG. 2 is a graph of the lateral acceleration signal value plotted against the driving speed signal valve with a limit line $aqg = f(v)$ above which gear step changes are avoided; and FIG. 3 a graph of the throttle valve signal value plotted against the engine rotational speed signal value with a limit line $azsg(nmot)$ for the recognition of a drive/coasting operation.

DETAILED DESCRIPTION OF THE DRAWINGS

Figure 1:
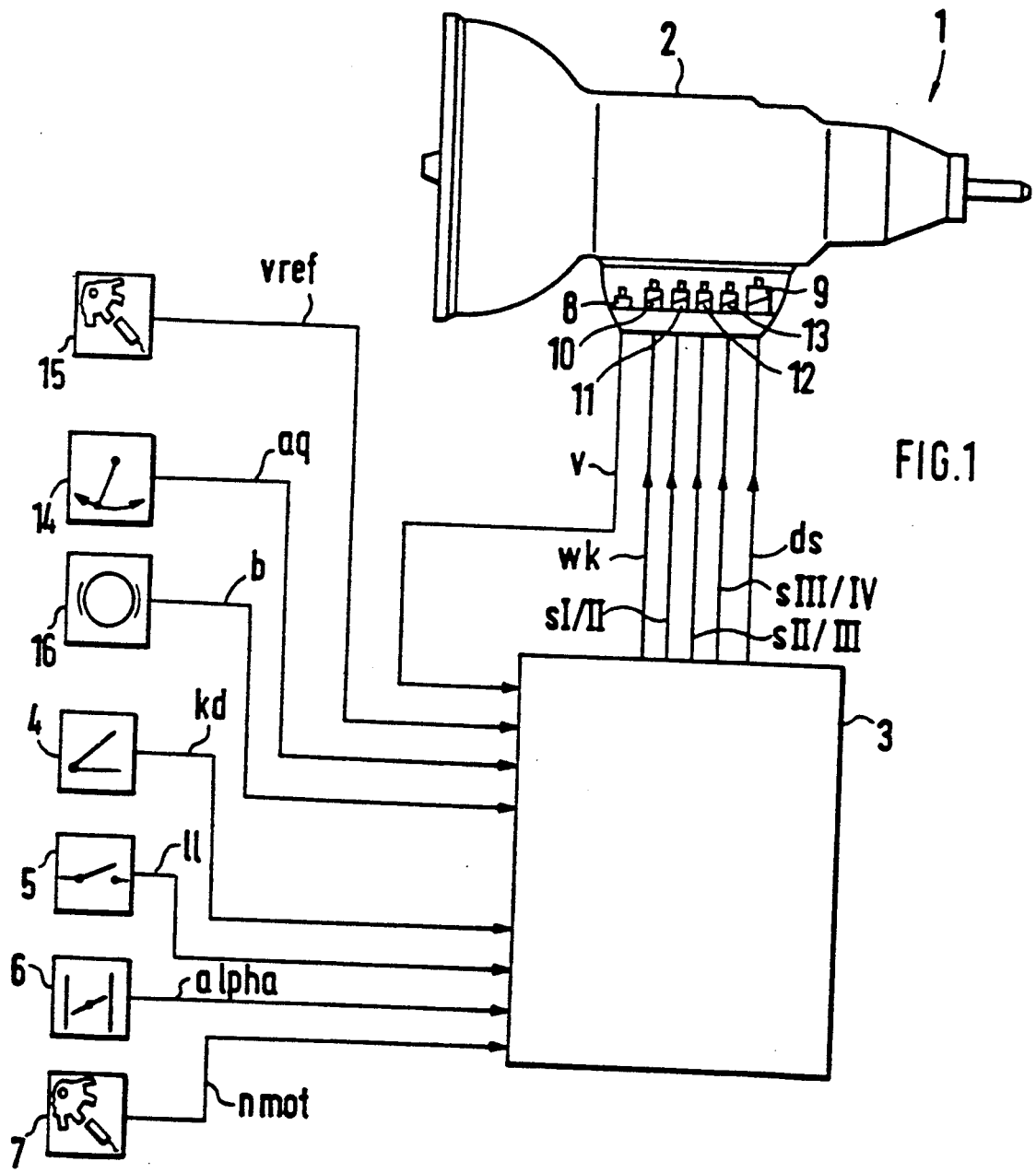
FIG. 1 is a block diagram of an electrohydraulic control system of a motor vehicle automatically shifting transmission.

FIG. 1 shows an electro-hydraulic transmission control system designated generally by the numeral 1 for an automatically shifting motor vehicle transmission 2 as described, for example, in Bosch's *"Technische Berichte"*, 7 (1983) 4 pp. 160–166 and in the *ATZ* 85 (1983) 6, pp. 401–405.

As a function of a kick-down signal kd of a kick-down function generator 4 at the accelerator pedal of the motor vehicle as well as of an idling signal 11 of a throttle switch 5, of a throttle valve angle signal alpha of a throttle valve angle generator 6, and of an engine rotational speed signal nmot, of an engine rotational speed generator 7 of an internal-combustion engine (not shown) and of a driving speed signal v (in actual practice, a transmission output rotational speed signal) of a transmission output rotational speed generator 8, a control apparatus 3 controls a pressure regulator 9 for a hydraulic fluid (signal output ds); a first solenoid valve 10 for controlling a converter or a converter lockup clutch (signal output wk); a second solenoid valve 11 for controlling a gear step change between gear steps I and II (signal output sI/II); a third solenoid valve 12 for controlling the gear step change between gear steps II and III (signal output sII/III); and a fourth solenoid valve 13 for controlling the gear step change between gear steps III/IV (signal output sIII/IV).

In the illustrated embodiment, the control can be influenced by the vehicle driver by a conventional selector lever (not shown) for the preselection of driving positions, namely P, R, N, D, 3, 2, 1. As a result, driving positions P (Park), R (reverse gear step), N (neutral gear step), D (automatic shifting of all four gear steps IV, III, II, I), 3 (automatic shifting of the three lower gear steps III, II, I) and 2 (automatic shifting of gear steps II and I) and 1 (setting the first gear step I) can be used. In the case of the above-described transmission, a program selector switch is also provided by virtue of which at least two shifting programs (SKFj) can be manually selected according to which the four gear steps in gear D are shifted.

This transmission control system 1 of the present invention also includes a lateral acceleration generator 14, which generates a lateral acceleration signal aq (a lateral acceleration signal value aq(t)), and by a speed generator 15 which generates a speed vref (reference speed signal vref(t)) as well as a braking signal generator 16 which generates braking signal b.

It is particularly desirable that an upshifting of the transmission be avoided when the vehicle approaches, for example, a turn in the road and the driver's foot leaves the accelerator pedal. It was found that such a recognition of bends ca take place by sensing the time variation of the throttle valve signal value dalpha/dt. The reason is that, as a rule, a driver takes back the accelerator pedal, and therefore naturally also the throttle valve, faster in front or in advance of a bend than he would under normal circumstances in order to, for example, reduce the driving speed.

An upshifting carried out by conventional transmission control systems when the accelerator pedal is released is delayed by a first time period (T1) if a speed of change dalpha/dt of the throttle valve signal value (alpha(t)) falls below a first limit value alphaq1. This first time period (T1) is also set to zero during a braking operation of the motor vehicle, and after the termination of the braking operation, an upshifting is delayed by a second time period (T2). Thus, it is achieved that also during and immediately after a braking operation no shifting takes place.

Also, a gear step change is avoided and/or the time periods T1, T2 are set to zero if the amount of the lateral acceleration signal value |aq| exceeds a limit line aqg=f(v(t)) which depends on the driving speed v(t), as shown, for example, in FIG. 2. Likewise, a gear step change is avoided as long as, after the falling below the limit line aqg=f(v(t)), a third period of time (T3) has not yet elapsed. As a result, unnecessary load changes are avoided during fast cornering which, under certain circumstances, may result in unstable vehicle conditions. Time periods T1, T2, T3 and a time period (T4), which will be described later, are, for example, between 1.6s and 3s and may, for example, be a function of the shifting program. Longer time periods can be used for power-oriented shifting programs.

Upshifting after the expiration of time periods T1, T2 and T3 can also be delayed by another fourth time period T4 as long as the engine is not yet back in the drive operation, and the time variation of the driving speed signal value dv(t)/dt has not yet assumed any positive values, for example, in order to give a driver some time after cornering or braking (without the occurrence of an upshifting), until he accelerates again. In this situation, the drive operation is recognized if the throttle valve signal value alpha(t) is larger than a characteristic limit line azsg=f(nmot), shown in FIG. 3, which is dependent on the engine rotational speed, and the time variation of the vehicle speed dv(t)/dt takes on positive values.

As a superordinated function for avoiding unstable driving conditions, such as excessive slip at the powered axle, it may be provided that an upshifting prevention be permitted only if a differential speed Dv=vref−v, Dv(t)=vref(t)−v(t) between a speed vref, vref(t) of a nonpowered axle and the driving speed v(t) detected at the powered axle (measured by way of the transmission output rotational speed) does not exceed a permissible differential speed value (Dvzul). In this case, the slip at the powered axle is simulated by the differential speed (Dv).

The following supplemental measures may be taken when the permissible differential speed value (Dvzul) is exceeded: (a) Opening of a converter lockup clutch of a transmission equipped with a torque converter; (b) setting of a hold time (T6) during which an upshifting cannot be prevented; (c) increasing of an engaged gear step (g) by one; and (d) the preventing of backshifts. These functions are set back again when the drive operation is, as mentioned above, recognized.

In a further embodiment of the present invention, an upshifting prevention can be permitted only if the lateral acceleration signal value (aq(t)) is larger than a second lateral acceleration limit value (aqg2); the time variation of the throttle valve signal value (dalpha(t)/dt) is larger than a second throttle valve speed limit value (alphag2); and the throttle valve signal value (alpha(t)) is smaller than a specific percentage of the engine-rotational-speed-dependent characteristic limit line (azsg(nmot)) according to FIG. 3. As a result, the vehicle can be prevented from turning in during cornering in the case of a sudden load change.

The values for the parameters indicated in the figures and in the specification are only standard values. The method itself may be implemented by a discretely constructed control system as well as by a microprocessor. In the case of a discretely constructed control system, the individual steps of the method are to be constructed as modules, whereas, in a microprocessor solution, they are implemented in the form of programs or program parts.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method for controlling an automatically shifting transmission, comprising the steps of generating signals representative of the position of the throttle valve, the engine rotational speed, and of a lateral acceleration, automatically shifting gear steps of the transmission by way of shifting programs as a function of the signals for preventing upshifts, and delaying an upshifting during a coast operation by a first time period if a speed of change of the throttle valve signal value falls below a first limit value.

2. The method according to claim 1, wherein the transmission is electrohydraulically controlled and is operatively arranged in a motor vehicle equipped with an internal combustion engine influenceable by one of an accelerator pedal and a throttle valve.

3. The method according to claim 1, further including the step of setting the first time period to zero during a braking operation of the motor vehicle, and after termination of the braking operation, delaying an upshifting during the coast operation by a second time period.

4. The method according to claim 3, wherein the transmission is electrohydraulically controlled and is operatively arranged in a motor vehicle equipped with an internal combustion engine influenceable by one of an accelerator pedal and a throttle valve.

5. The method according claim 2, wherein a gear step change is avoided and/or the time periods are set to zero if the amount of the lateral acceleration signal value exceeds a limit line which is a function of driving speed, or as long as, after the falling-below the limit, a third time period has not yet elapsed after the lateral acceleration signal value falls below the limit line.

6. The method according to claim 5, further including the step after expiration of the time periods of permitting an upshifting again only in the drive operation and after the expiration of a fourth time period.

7. The method according to claim 5, including the step of recognizing the drive operation when the throttle valve signal value is larger than an engine-rotational-speed-dependent characteristic limit line, and a time variation of a driving speed signal value assumes positive values.

8. The method according to claim 7, further including the step after expiration of the time periods, of permitting an upshifting again only in the drive operation and after the expiration of a fourth time period.

9. The method according to claim 7, wherein the step of preventing upshifts is permitted only if a differential speed between a speed of a nonpowered axle and the driving speed detected at a powered axle does not exceed a permissible differential speed value.

10. The method according to claim 9, further including the steps when the permissible differential speed value is exceeded, of opening a converter lockup clutch of a transmission equipped with a torque converter, setting a fourth hold time during which an upshifting cannot be prevented, increasing the engaged gear step by one, preventing downshifts and restoring these functions to their settings when the drive operation is recognized and positive values of the change of the driving speed signal value exist.

11. The method according to claim 7, wherein the step of preventing upshifts is permitted only if the lateral acceleration signal value is larger than a second lateral acceleration limit value, the time variation of the throttle valve signal value is larger than a second throttle valve speed limit value and the throttle valve signal value is smaller than a certain percentage of the engine-rotational-speed-dependent characteristic limit line.

12. The method according to claim 11, further including the steps when the permissible differential speed value is exceeded, of opening a converter lockup clutch of a transmission equipped with a torque converter, setting a fourth hold time during which an upshifting cannot be prevented, increasing the engaged gear step by one, preventing downshifts and restoring these functions to their settings when the drive operation is recognized and positive values of the change of the driving speed signal value exist.

13. An apparatus for implementing the method according to claim 1, comprising an electrohydraulic transmission control system equipped with a microprocessor which detects signals of at least one engine rotational speed sensor, one throttle valve sensor, one lateral acceleration sensor, and one driving speed sensor and, by way of these signals and shifting programs, generates gear step change signals controlling electrohydraulic gear step change valves, a device for formation or simulation of the time-related derivation of a throttle valve signal value provided by the throttle valve sensor 6, and a comparing device which compares the time-related derivation of the throttle valve signal value with a first throttle valve speed limit value and, if the limit value is exceeded, emits a signal to the transmission control system which prevents an upshifting.

* * * * *